(12) United States Patent
Song et al.

(10) Patent No.: US 7,854,985 B2
(45) Date of Patent: Dec. 21, 2010

(54) DECORATIVE PAINT FILM LAMINATE

(75) Inventors: Quan Song, Matthews, NC (US); Jingfu Fan, Charlotte, NC (US); Jerry Patton, Charlotte, NC (US)

(73) Assignee: Soliant LLC, Lancaster, SC (US)

( * ) Notice: Subject to any disclaimer, the term of this patent is extended or adjusted under 35 U.S.C. 154(b) by 1051 days.

(21) Appl. No.: 11/283,242

(22) Filed: Nov. 18, 2005

(65) Prior Publication Data

US 2007/0116903 A1 May 24, 2007

(51) Int. Cl.
B32B 7/02 (2006.01)
B32B 27/26 (2006.01)
B32B 27/30 (2006.01)
B32B 27/34 (2006.01)
B32B 27/40 (2006.01)

(52) U.S. Cl. ............... 428/212; 428/40.1; 428/41.5; 428/41.6; 428/41.7; 428/213; 428/215; 428/334; 428/335; 428/343; 428/353; 428/354; 428/421; 428/422; 428/423.1; 428/474.4; 428/475.5; 428/522

(58) Field of Classification Search ............ None
See application file for complete search history.

(56) References Cited

U.S. PATENT DOCUMENTS

| | | | | |
|---|---|---|---|---|
| 3,111,450 A | 11/1963 | Stevens | ............ | 161/189 |
| 3,458,391 A | 7/1969 | Miller, Jr. | ............ | 161/189 |
| 3,459,834 A | 8/1969 | Schmitt | ............ | 260/898 |
| 3,582,501 A | 6/1971 | Hostettler et al. | ............ | 260/2.5 |
| 4,275,099 A | 6/1981 | Dani | ............ | 428/31 |
| 4,678,690 A | 7/1987 | Palmer et al. | ............ | 428/31 |
| 4,868,030 A * | 9/1989 | Mentzer et al. | ............ | 428/174 |
| 4,936,936 A * | 6/1990 | Rohrbacher | ............ | 156/239 |
| 5,001,000 A * | 3/1991 | Rohrbacher et al. | ......... | 428/215 |
| 5,026,448 A | 6/1991 | Reafler et al. | ............ | 156/212 |
| 5,108,836 A | 4/1992 | Ocampo et al. | ............ | 428/335 |
| 5,122,560 A * | 6/1992 | Johnson | ............ | 524/315 |
| 5,132,164 A | 7/1992 | Moriya et al. | ............ | 428/199 |
| 5,215,826 A | 6/1993 | Shimanski et al. | .......... | 428/483 |
| 5,268,215 A * | 12/1993 | Krenceski et al. | ............ | 428/213 |
| 5,316,608 A | 5/1994 | Ocampo et al. | ............ | 156/230 |

(Continued)

FOREIGN PATENT DOCUMENTS

EP 0 949 120 * 10/1999

(Continued)

OTHER PUBLICATIONS

Written Opinion for International application No. PCT/US2006/044502 (May 18, 2008).

(Continued)

*Primary Examiner*—Vivian Chen
(74) *Attorney, Agent, or Firm*—Timothy D. Meade (57) ABSTRACT

A decorative paint film laminate having high gloss and distinctness of image after processing for providing a decorative finish for a part, the decorative paint film laminate comprises a paint film having an inner surface and an outer surface, a backing sheet applied to the inner surface of the paint film, and no mask on the outer surface of the paint film. The paint film comprises a clear coat layer, a gloss and distinctness of image retaining layer, and a color coat layer. The paint film obtains high gloss and distinctness of image without a mask being on the outer surface of the paint film.

39 Claims, 8 Drawing Sheets

U.S. PATENT DOCUMENTS

| | | | |
|---|---|---|---|
| 5,342,666 A | 8/1994 | Ellison et al. | 428/46 |
| 5,352,532 A | 10/1994 | Kline | 428/447 |
| 5,514,427 A | 5/1996 | Ellison et al. | 428/31 |
| 5,518,786 A * | 5/1996 | Johnson et al. | 428/40.6 |
| 5,536,539 A | 7/1996 | Ellison et al. | 428/31 |
| 5,564,249 A | 10/1996 | Borys et al. | 527/716.5 |
| 5,707,697 A | 1/1998 | Spain et al. | 428/31 |
| 5,725,712 A * | 3/1998 | Spain et al. | 156/230 |
| RE35,894 E | 9/1998 | Ellison et al. | 428/46 |
| RE35,970 E | 11/1998 | Ellison et al. | 428/31 |
| 5,916,643 A | 6/1999 | Spain et al. | 428/31 |
| 5,960,527 A | 10/1999 | Ellison et al. | 29/428 |
| 5,968,657 A | 10/1999 | Scullin et al. | 428/423.1 |
| 5,976,677 A * | 11/1999 | Umeda et al. | 428/207 |
| 5,985,079 A * | 11/1999 | Ellison | 156/244.23 |
| RE36,457 E | 12/1999 | Ellison et al. | 428/31 |
| 6,083,335 A | 7/2000 | Scullin et al. | 156/196 |
| 6,096,396 A | 8/2000 | Patton et al. | 428/40.1 |
| 6,177,189 B1 | 1/2001 | Rawlings et al. | 428/343 |
| 6,180,195 B1 | 1/2001 | Ellison et al. | 428/31 |
| 6,287,672 B1 * | 9/2001 | Fields et al. | 428/209 |
| 6,319,438 B1 * | 11/2001 | Smith et al. | 264/75 |
| 6,399,193 B1 * | 6/2002 | Ellison | 428/354 |
| 6,423,778 B1 * | 7/2002 | McGee et al. | 525/165 |
| 6,440,546 B1 * | 8/2002 | Fields et al. | 428/220 |
| 6,475,616 B1 | 11/2002 | Dietz et al. | 428/355 AC |
| 6,551,432 B1 | 4/2003 | Spain et al. | 156/230 |
| 6,565,955 B2 * | 5/2003 | Fields et al. | 428/209 |
| 6,579,397 B1 | 6/2003 | Spain et al. | 156/230 |
| 6,649,003 B1 | 11/2003 | Spain et al. | 156/230 |
| 6,824,818 B2 * | 11/2004 | McCoy et al. | 427/146 |
| 6,838,130 B1 | 1/2005 | Spain et al. | 428/31 |
| 7,132,142 B2 * | 11/2006 | Truog et al. | 428/40.1 |
| 7,297,397 B2 * | 11/2007 | Leininger | 428/332 |
| 2001/0051255 A1 * | 12/2001 | Fields et al. | 428/209 |
| 2002/0048665 A1 * | 4/2002 | Fields et al. | 428/209 |
| 2002/0050665 A1 | 5/2002 | Roys et al. | 264/345 |
| 2002/0137872 A1 * | 9/2002 | Schneider et al. | 528/44 |
| 2002/0192440 A1 * | 12/2002 | Fields et al. | 428/209 |
| 2003/0026932 A1 | 2/2003 | Johnson et al. | 428/40.1 |
| 2003/0203190 A1 | 10/2003 | Schmidt et al. | 428/335 |
| 2004/0018344 A1 | 1/2004 | Watkins et al. | 428/156 |
| 2004/0033365 A1 | 2/2004 | Dey et al. | 428/421 |
| 2004/0142176 A1 | 7/2004 | Wang | 428/412 |
| 2004/0159969 A1 * | 8/2004 | Truog et al. | 264/132 |
| 2004/0161567 A1 * | 8/2004 | Truog et al. | 428/40.1 |
| 2004/0166323 A1 | 8/2004 | Wang | 428/412 |
| 2004/0200564 A1 | 10/2004 | Kinsey et al. | 156/230 |
| 2004/0247876 A1 * | 12/2004 | LaFave et al. | 428/411.1 |

FOREIGN PATENT DOCUMENTS

| | | |
|---|---|---|
| WO | WO 94/09983 | 5/1994 |
| WO | WO 00/51829 | 9/2000 |
| WO | WO 00/78539 A1 | 12/2000 |

OTHER PUBLICATIONS

International Preliminary Report on Patentability for International application No. PCT/US2006/044502 dated May 20, 2008.

* cited by examiner

DECORATIVE PAINT FILM LAMINATE

FIELD OF THE INVENTION

The present invention relates to a decorative paint film laminate that has high gloss and distinctness of image after processing without the use of a mask on the outer surface of the paint film, and a method for the making of the decorative paint film laminate.

BACKGROUND OF THE INVENTION

Manufacturers have shown increasing interest in using paint film in lieu of spray painting for providing a decorative surface finish for parts such as automotive body parts. These parts can be manufactured using one or more of the following forming or molding processes: thermoforming, injection molding, or compression molding. In general, most processes using paint film such as thermoforming involve forming the film into a three dimensional shape and involve the use of heat and pressure. Depending upon a variety of factors including, for example, the geometry of an automobile body part, the automobile body part may or may not require an injection molding process, as long as the part is sturdy enough to facilitate the manufacturing process and is suitable for the intended end use application.

Paint films have been used for many years in a variety of applications and uses. Current products tend to lose gloss and distinctness of image (DOI) when processed, such as thermoformed, especially in high stretch areas. In many of the current paint film applications, especially high stretch applications, this deficiency has been overcome with the use of a mask to achieve high gloss and DOI for the surface finishes during thermoforming. In order to maintain the gloss and DOI, the mask must have sufficient modulus at the thermoforming temperature to maintain the smooth surface finish. In these applications, a thermoformable mask film is applied and removably adhered to the clear coat surface of the decorative sheet before the thermoforming process. In many cases, the mask is removed and discarded during the part manufacturing process, for example, before the injection molding process. The materials and manufacturing process of the mask film add significant cost to the parts produced using paint film. In addition, the use of the mask, in some cases, complicates the forming and molding processes. For example, the mask may need to be removed before an injection molding process to prevent the difficulty of removal after the parts are molded. The mask may be difficult to remove because it has been stretched substantially and becomes prone to tear and must be removed in pieces adding significant labor and possible contamination in subsequent processing. Furthermore, to date, known masked paint films have not been able to achieve a 20° gloss that is within the lower gloss range of traditional paints. Therefore, the present invention attempts to address and solve these problems.

SUMMARY OF THE INVENTION

The present invention relates to a decorative paint film laminate having improved high gloss and distinctness of image (DOI) after processing without the use of a mask on the outer surface of the paint film. The decorative paint film laminate basically comprises a gloss and DOI retaining layer in addition to a clear coat layer and a color coat layer. The gloss and DOI retaining layer functions an "internal" mask and has, among other properties, excellent clarity, good adhesion to both clear and color layers, good weatherability, and thermoformability.

The decorative paint film laminate comprises a paint film having an inner surface and an outer surface, and a backing sheet applied to the inner surface of the paint film. The paint film comprises a clear coat layer, a gloss and DOI retaining layer, and a color coat layer. The paint film may optionally comprise any of a color adjustment layer, a primer layer, and an adhesive layer. Also within the scope of the present invention is a composite shaped part, a method of making a decorative paint film laminate, and a paint film comprising a gloss and DOI retaining layer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENTS

The present invention will now be described more fully hereinafter with reference to the accompanying drawings. The following description of the preferred embodiment(s) is merely exemplary in nature and is in no way intended to limit the invention, its application, or uses.

The decorative paint film laminate of the present invention eliminates the need for a mask on the outer surface of a paint film in order to make a part, such as an automobile part, having high gloss and distinctness of image (DOI) using paint film technology. The term "mask", as defined herein, refers to any material that is adhered to, removably or otherwise, to the outer surface of a paint film. Elimination of the need for a mask on the outer surface of a paint film simplifies the manufacturing process during forming and molding processes and also reduces the cost of materials for making a part.

Figure 1:
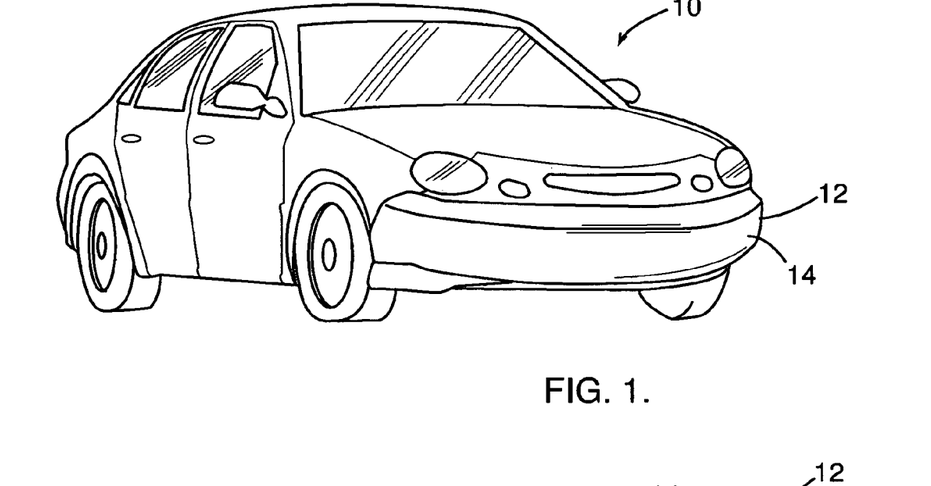
FIG. 1 is a perspective view of an automobile illustrating the front fascia of an automobile having a decorative paint film applied thereto.

Referring now to the accompanying drawings and initially to FIG. 1, the decorative paint film laminate of the present invention is indicated in FIG. 1 by reference numeral 14 and basically comprises a clear coat layer, a gloss and DOI retaining layer, a color coat layer, an optional primer layer, an optional adhesive layer, and a backing sheet.

FIG. 1 illustrates an automobile 10 having a composite shaped part 12. As shown, the composite shaped part 12 is a complex, contoured three-dimensional front fascia of the automobile 10. The composite shaped part 12 has a decorative paint film laminate 14 applied thereto. Although not limited to such applications, the decorative paint film laminate 14 of the present invention is particularly advantageous for providing a decorative surface on a composite shaped part 12 of an automobile 10. However, those skilled in the art will appreciate that the present invention could be used in a variety of applications requiring a decorative surface having high gloss and DOI.

Figure 2:
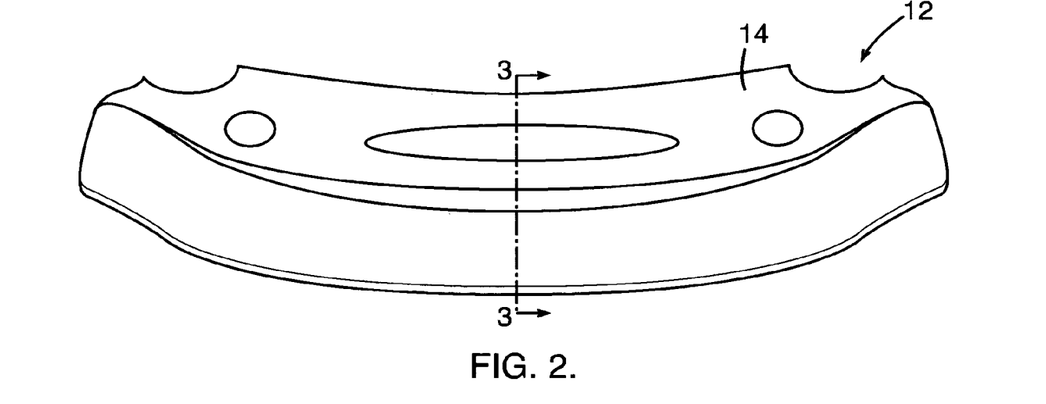
FIG. 2 is a front view of an automobile front fascia having a decorative paint film applied thereto.
Figure 3:
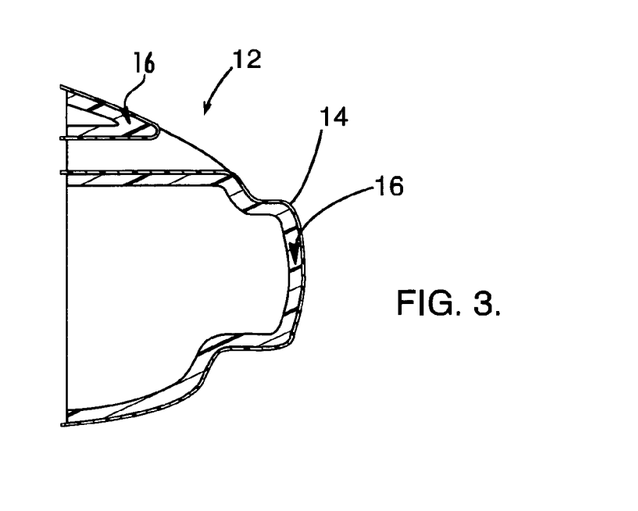
FIG. 3 is a cross-sectional view of the fascia shown in FIG. 2 taken along line 3-3 of FIG. 2.

FIG. 2 is a front view of the composite shaped part 12 having the decorative paint film laminate 14 applied thereto. FIG. 3 is a cross-sectional side view of the composite shaped part 12 comprising a substrate 16 having a decorative paint film laminate 14 applied thereto. As illustrated in FIG. 3, the decorative paint film laminate 14 undergoes different amounts of elongation at different points along the contoured surface of the composite shaped part 12. In one embodiment, the decorative paint film laminate 14 of the present invention has a three-dimensional configuration in which certain areas of the paint film laminate have been subjected to elongation up to, and even in excess of, about 300%, and other areas of the paint film laminate are substantially non-elongated. The decorative paint film laminate 14 of the present invention is capable of maintaining not only a uniform level of gloss but also a high level of gloss, regardless of the amount of elongation experienced by the decorative paint film laminate 14 during a forming or molding process.

Figure 4:
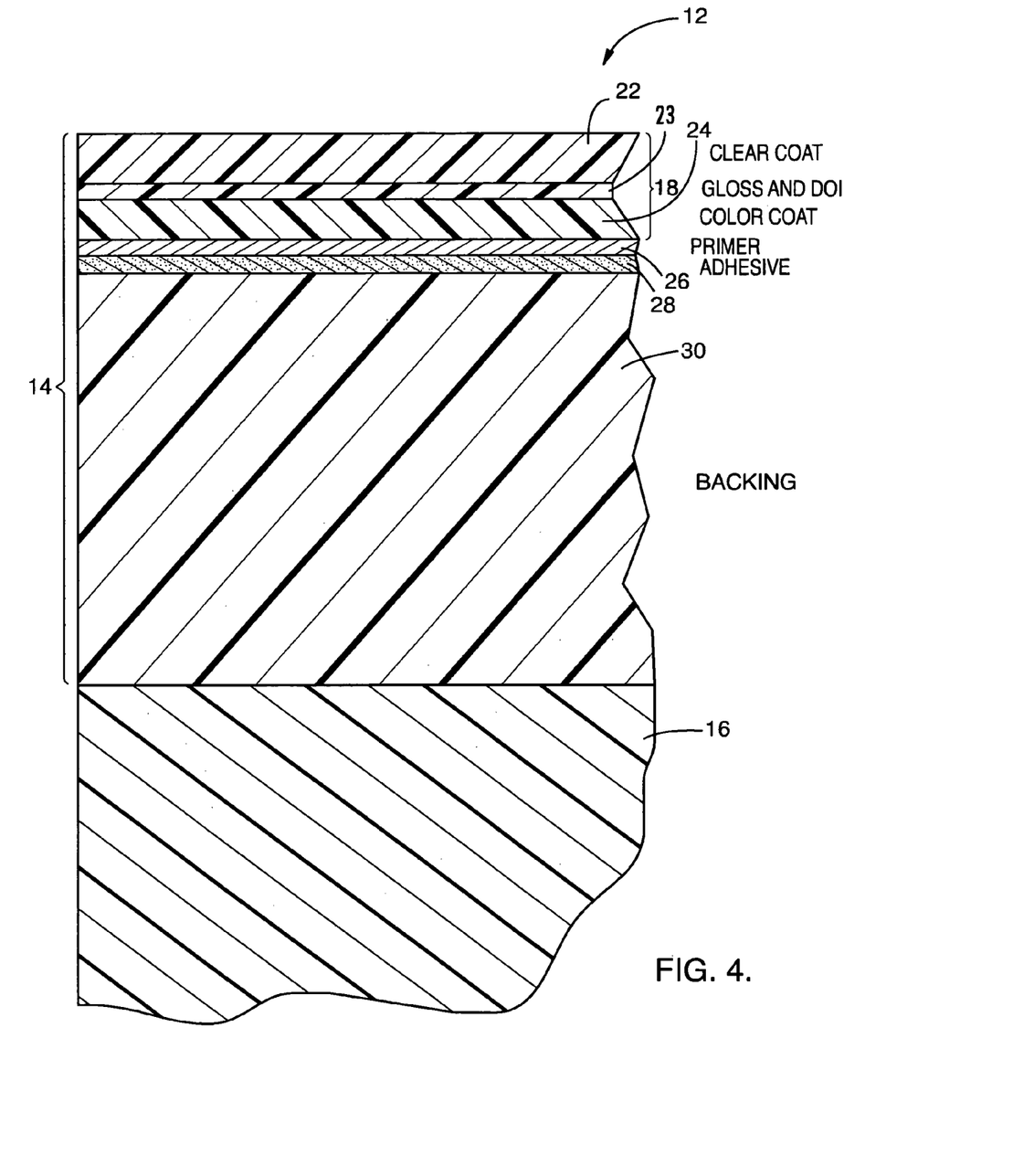
FIG. 4 is a cross-sectional view of the decorative paint film laminate of the present invention adhered to a substrate.

FIG. 4 shows a greatly expanded cross-sectional view of a composite shaped part 12 comprising a decorative paint film laminate 14 of the present invention adhered to a substrate 16. The decorative paint film laminate 14 includes a clear coat layer 22, a gloss and DOI retaining layer 23, a color coat layer 24, an optional primer layer 26, an optional adhesive layer 28, and a backing sheet 30.

The decorative paint film laminate 14 of the present invention not only retains both high gloss and DOI during forming and molding processes in the absence of a mask on the outer surface of the paint film but also improves the gloss and DOI of the paint film due to the presence of the gloss and DOI retaining layer. Examples of forming processes include, but are not limited to, thermoforming, cold stretching, and vacuum forming. Examples of molding processes include, but are not limited to, injection molding, compression molding, and blow molding.

Current commercial paint film products utilize a removable, thermoformable mask to minimize the gloss and DOI reduction during the thermoforming or molding processes. In those situations, the mask layer is the outer layer of the decorative paint film laminate. The clear coat layer 22 in the present invention is the outer layer of the decorative paint film laminate 14 during construction of the final product, such as an automobile. Therefore, a benefit of the decorative paint film laminate of the present invention is enhanced gloss and DOI of the paint film despite the absence of a mask layer on the outer surface of the paint film. Thus, the present invention is advantageous not only because no mask is needed, but also because the gloss and DOI of the paint film are enhanced with the presence of the gloss and DOI retaining layer as compared to a paint film with a mask but no gloss and DOI retaining layer. Furthermore, there are no material, manufacturing, labor or other costs incurred due to the presence and ultimate removal of a mask from the clear coat layer. When a mask is used, the mask layer must be releasably bonded to the underlying decorative paint film and must be stripped away from the underlying layers in a single piece. The decorative paint film laminate of the present invention eliminates the need for a mask.

The weatherable outer surface of a standard paint film has an initial 20 and 60 degree gloss of at least about "60" in dry film form. After thermoforming the dry film laminate, the 20 degree gloss and 60 degree gloss may decline by 50% or more in high stretch applications. Adhering a mask layer to the paint film may improve the 20 degree and 60 degree gloss retention but still shows gloss loss during the forming process, especially the 20 degree gloss. Industry standards typically require that the 20 degree gloss and 60 degree gloss be above 60 for many applications. However, the desired final gloss value of the paint film will vary depending on the application. In contrast, the decorative paint film laminate of the present invention has enhanced high gloss and DOI as compared to a standard paint film laminate with a mask.

Figure 5:
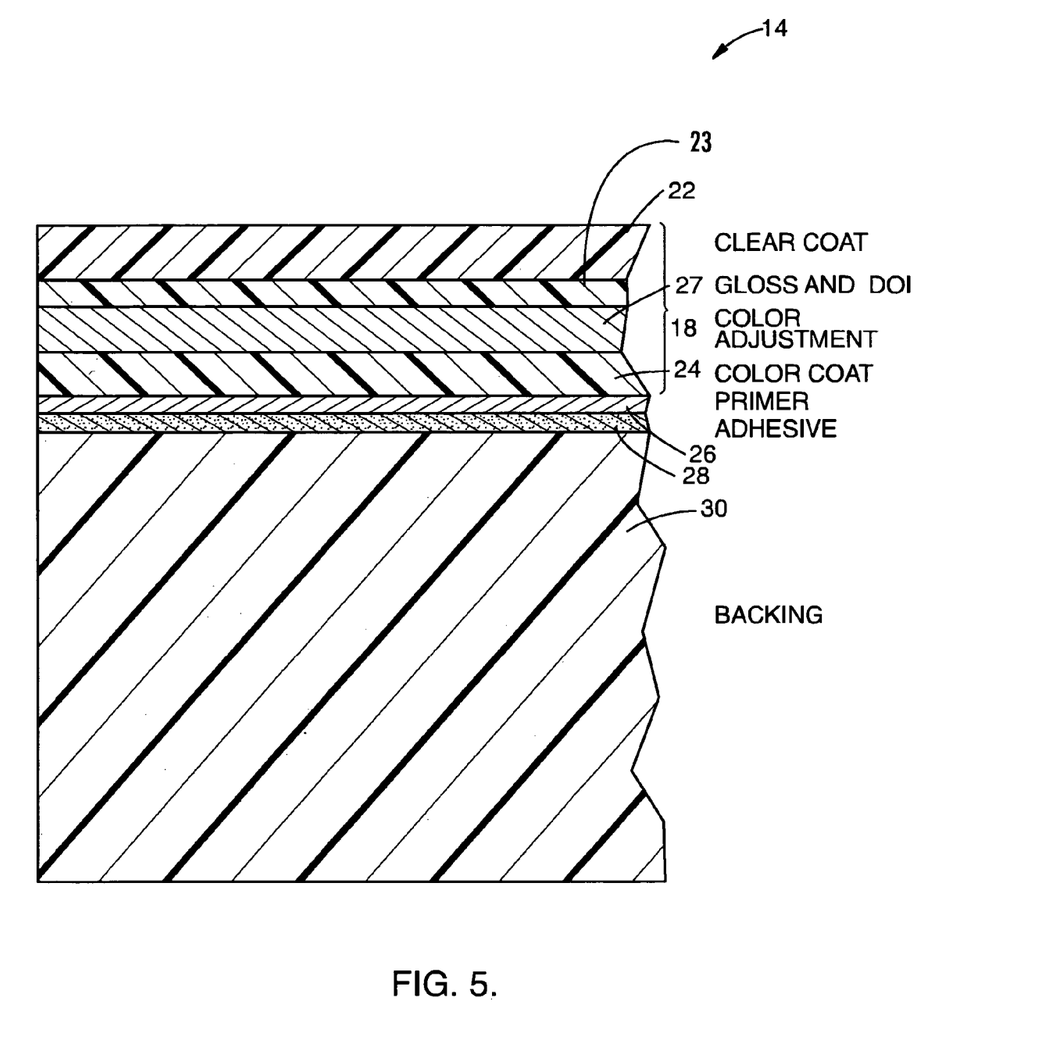
FIG. 5 is a cross-sectional view of the decorative paint film laminate of the present invention including a clear coat layer, gloss and DOI retaining layer, a color adjustment layer, and a color coat layer.

FIG. 4 and FIG. 5 are greatly expanded cross-sectional views of the decorative paint film laminate 14 of the present invention. As shown in FIGS. 4 and 5, the decorative paint film 18 may comprise a clear coat layer 22, a gloss and DOI retaining layer 23, an optional color adjustment layer 27 (shown in FIG. 5), and a color coat layer 24. The clear coat layer 22 is formed from a substantially transparent weatherable, UV protective polymer composition selected to provide a film which will not significantly fade, peel, crack, or chalk when exposed to the environment for the intended life of the part 12 or fulfill other characteristics desired such as toughness, scratch resistance, and marr resistance, for example. Additionally, the clear coat layer 22 must be formable from a two-dimensional surface to a three-dimensional surface without objectionable loss of appearance or performance properties. The clear coat layer 22 may include, but is not limited to: urethane polymers such as polyurethane; acrylic polymers; fluoropolymers such as polyvinyl fluoride (PVF) and polyvinylidene fluoride (PVDF); and alloys of a fluoropolymer and an acrylic polymer. TEDLAR® manufactured by DuPont of Wilmington, Del. is an example of a polyvinyl fluoride. FLUOREX® films manufactured by Soliant, LLC of Lancaster, S.C. are examples of alloys of a fluoropolymer and an acrylic polymer such as a PVDF/acrylic alloy. The clear coat layer 22 may include other additives including, but not limited to, UW screeners, antioxidants, heat stabilizers, and other conventional additives. Preferably, the clear coat layer 22 is about 0.3 mils to about 3 mils in thickness, more preferably from about 0.5 mils to about 2.5 mils in thickness. Preferably, the clear coat layer is applied in the form of a solution.

In one embodiment, the outermost layer of the paint film 18, such as the clear coat layer 22, comprises an alloy of a fluoropolymer and an acrylic polymer. For example, the alloy of fluoropolymer and acrylic polymer may comprise about 30 to about 70 weight percent fluoropolymer, and about 30 to about 70 weight percent acrylic polymer on a dry solids basis. A commercially available fluoropolymer is KYNAR SL manufactured by Arkema, Inc. of Philadelphia, Pa. Commercially available acrylic polymers are Elvacite 2041 manufactured by INEOS Acrylics of Cordova, Tenn. and Acryloid A11 manufactured by Rohm & Haas of Philadelphia, Pa.

The gloss and DOI retaining layer 23 serves as an "internal mask" such that the decorative paint film laminate 14 has improved high gloss and DOI as compared to the use of a mask on the outer surface of a paint film. The composition of the gloss and DOI retaining layer 23 is preferably selected such that the tensile strength of the gloss and DOI retaining layer is the same as or higher than the higher of the tensile strength of either the clear coat layer or the color coat layer at the thermoforming temperature. More preferably, the gloss and DOI retaining layer has a tensile strength that is higher than the higher of the tensile strength of either the clear coat layer or the color coat layer at the thermoforming temperature. The thermoforming temperature varies depending upon the composition of the materials selected for use in the layers. However, the thermoforming temperature would be known to one of ordinary skill in the art for a given material. The term "thermoforming temperature", as used herein, refers to the temperature at which a thermoplastic material is shaped or formed. Therefore, materials suitable for use in the gloss and DOI retaining layer may include, but are not limited to, urethanes, acrylics, fluoropolymers, nylons, alloys or combinations thereof An example of a preferred urethane includes, but is not limited to, polyurethane. Examples of preferred fluoropolymers include, but are not limited to, polyvinylidene fluoride (PVDF), polyvinyl fluoride (PVF) and alloys or combinations thereof TEDLAR® is an example of a polyvinyl fluoride manufactured by DuPont of Wilmington, Del.

The gloss and DOI retaining layer may be applied, for example, in the form of a dispersion or a solution. The gloss and DOI retaining layer is preferably cast or coated. The gloss and DOI retaining layer is preferably about 0.2 mils to about 2.0 mils in thickness.

A cross-linking agent may be used in the gloss and DOI retaining layer. Examples of cross-linking agents include, but are not limited to, poly-aziridine, poly-isocyanate, blocked poly-isocyanate, and amino cross-linking agents. XAMA 7 is an example of a commercially available poly-aziridine cross-linking agent manufactured by Bayer Corp. of Pittsburgh, Pa. API-972 is an example of a commercially available blocked isocyanate manufactured by Advanced Polymer, Inc. of Carlstadt, N.J. The level of cross-linking agent may vary from 0.1 to 4.0 percent of the solids of the formulation.

Commercially available examples of polyurethane polymers may include, cross-linkable polyurethane dispersions such as HYBRIDUR 580 and HYBRIDUR 870, both manufactured by Air Products of Allentown, Pa.; HD 4669 and HD 2113, both manufactured by C.L. Hauthaway and Sons Corporation of Lynn, Mass.

Commercially available examples of acrylic polymers used for solvent casting may include, but are not limited to, ELVACITE 2041, ELVACITE 2014 and ELVACITE 2552, all of which are manufactured by INEOS Acrylics of Cordova, Tenn.; and Br85, manufactured by Dianal America, Inc. of Pasadena, Tex.

Commercially available acrylic dispersions suitable for use in this invention include, but are not limited to, AS 2505 and AS 2511, both manufactured by Alberdingk Boley, Inc. of Charlotte, N.C.

The color coat layer 24 is formed of a polymer composition comprising a uniformly dispersed pigment and/or metallic flakes or pearlescents to provide the appearance necessary for exterior automobile use. Preferably, the color coat layer 24 may comprise a polymer selected from the group consisting of urethanes such as polyurethane, acrylics, fluoropolymers such as PVDF, and alloys and combinations thereof FLUOREX® films manufactured by Soliant, LLC of Lancaster, S.C. are examples of alloys of a fluoropolymer and an acrylic polymer. The color coat layer 24 may include pigments, dyes, and/or flakes to enhance visual appearance and improve weatherability. Preferably, the color coat layer 24 is about 0.2 to about 3 mils in thickness, more preferably 0.2 mils to 2.5 mils in thickness.

If desired, a color adjustment layer 27 may be added between the clear coat layer 22 and the color coat layer 24 to enhance visual appearance, preferably between the gloss and DOI retaining layer and the color coat layer. The color adjustment layer 27 can be applied in coating form and may include pigments, dyes and/or flakes or applied as a graphic design using printing methods such as gravure, rotary screen, flat bed step-and-repeat screen, ink jet, flexographic or other printing techniques. This layer is typically used for appearance purposes to match three layer paint systems.

The primer layer 26 is an optional layer that improves adhesion between the color coat layer 24 and the adhesive layer 28. The primer layer 26 preferably comprises an acrylic polymer prepared in solution using any compatible solvent known in the art, such as toluene. In one embodiment, the primer layer 26 is prepared from a solution comprising about 50 to about 85 weight percent acrylic composition and about 5 to about 20 weight percent solvent. An acrylic polymer suitable for use in the primer layer 26 is acrylic adhesive 68070 manufactured by DuPont. The primer layer 26 may be opaque, colored or clear. Opaque is defined as less than 1 percent transmission at a wavelength of less than 400 nm. The primer layer 26 is preferably about 0.2 to about 2 mils in thickness. The primer layer 26 may be colored or opaque to protect the underlying backing sheet 30 from damage caused by UV exposure. Pigments, such as carbon black, titanium oxide, and mixtures thereof, may be added to impart color to the acrylic polymer composition used in the primer layer 26. Additionally, additives such as UV screeners, antioxidants, and heat stabilizers may be added to the primer layer 26.

An optional adhesive layer 28 may be used to adhere the decorative paint film 18 to a backing sheet 30. The composition of the adhesive depends upon, among other factors, the chemistry of color layer and the type of backing sheet used. For certain substrates such as ABS and polystyrene substrates, the presence of the adhesive layer is often not preferred. However, for other backing sheets such as thermoplastic polyolefin (TPO), an adhesive layer may be preferred. An example of a suitable adhesive for TPO is an acrylic primer/CPO adhesive.

The adhesive layer 28 may include, but is not limited to, one or more layers of urethane adhesives, acrylic adhesives, acrylic adhesives with cross linkers, chlorinated polyolefins and mixtures thereof Preferably, a mixture of a chlorinated polypropylene and a higher molecular weight chlorinated polyolefin is used. In one embodiment, the adhesive layer 28 is prepared from a mixture of about 5 to about 20 weight percent chlorinated polypropylene and about 1 to about 10 weight percent of a higher molecular weight chlorinated polypropylene formed in solution. A compatible solvent known in the art, such as toluene, is present in an amount of about 60 to about 80 weight percent. A chlorinated polypropylene suitable for use with the present invention is HARDLEN 13 LP manufactured by Advanced Polymer. A higher molecular weight chlorinated polyolefin suitable for use with the present invention is SUPERCHLON 822S manufactured by CP/Phibrochem of Fort Lee, N.J. The adhesive layer 28 should preferably be capable of stretching about 20 to about 600 percent.

Due to the substantial elongation capability of the adhesive layer 28, the adhesive layer maintains the necessary adhesive strength to prevent delamination of the decorative paint film 18 from the backing sheet 30 over a wide temperature range.

An epoxy component, such as EPON 828RS manufactured by Shell Chemical, may be added in small amounts (approximately about 0.1 to about 2.0 weight percent on a dry solids basis) as an acid scavenger. As with the primer layer 26, the adhesive layer 28 may be colored or opaque to protect the underlying thermoformable backing sheet 30 from damage caused by UV exposure. Pigments, such as carbon black, titanium oxide, and mixtures thereof, may be added to impart color to the polymer composition used in the adhesive layer 28. Additives including, but not limited to, UV screeners, antioxidants, and heat stabilizers may be added to the adhesive layer 28. Preferably, the adhesive layer 28 is about 0.2 to about 2 mils in thickness.

The backing sheet 30 bonds the decorative paint film 18 of the decorative paint film laminate 14 to the substrate 16. In addition, the backing sheet 30 provides bulk and/or rigidity for handling the decorative paint film laminate 14 as a thermoformed preform. The backing sheet 30 also provides thickness to prevent glass fibers, fillers or other sources of visual roughening or "orange peel" from the substrate 16 from affecting the visual appearance of the decorative paint film laminate 14. The backing sheet 30 must bond well with both the substrate 16 and the adhesive layer 28. The backing sheet 30 may be of a material including, but not limited to, thermoplastic polyolefin, acrylonitrile-butadiene-styrene (ABS) terpolymer, polypropylene, polyethylene, thermoplastic polyimide, polyethylene oxide, polycarbonate, polyvinyl chloride, polystyrene, styrene/polyphenylene oxide (NORYEL), polybutylene terephthalate, nylon, PETG copolyester, and mixtures, laminates, copolymers and other combinations thereof, depending on the material used as the substrate 16.

Figure 6:
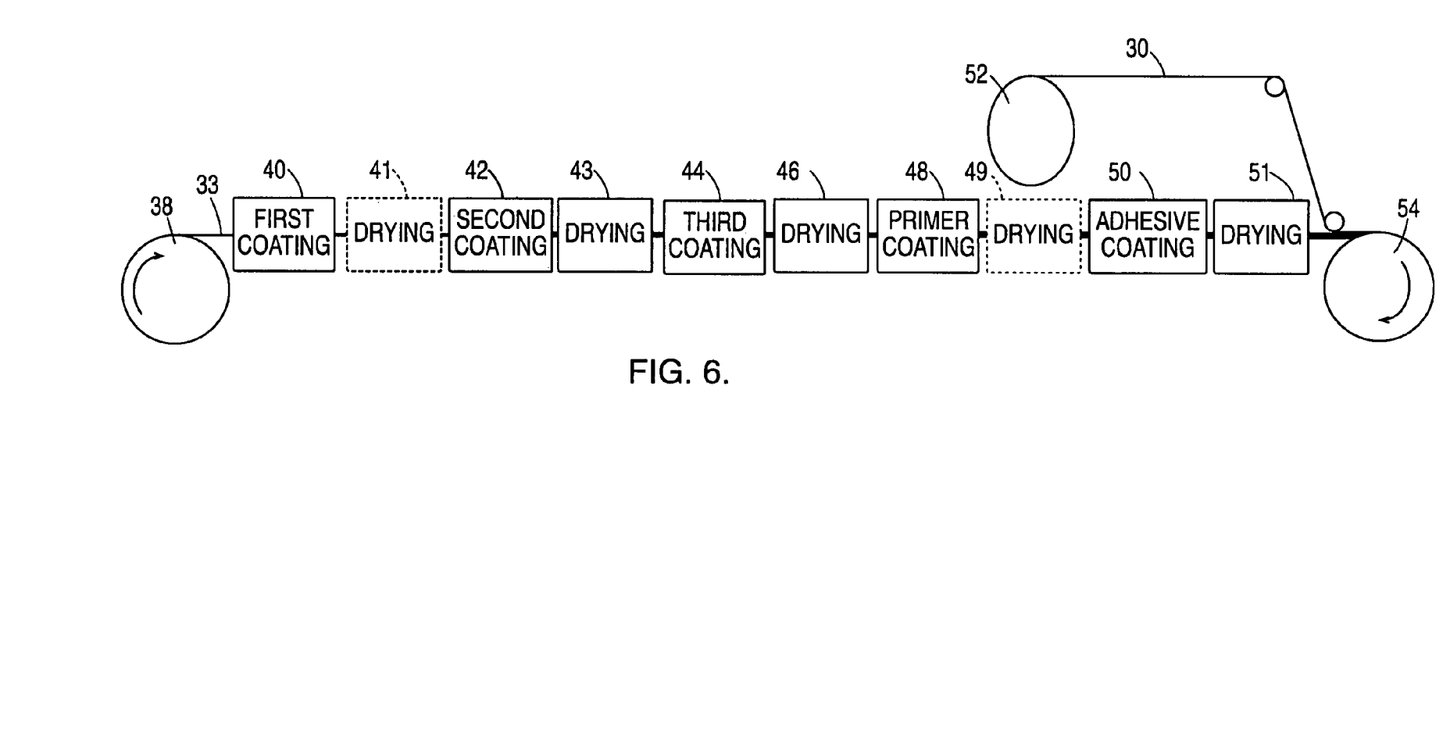
FIG. 6 is a schematic illustration of a process for construction of the decorative paint film laminate in accordance with the present invention.

FIG. 6 illustrates a process for constructing the decorative paint film laminate 14 of the present invention. As shown, a film carrier 33 is advanced from a supply roll 38 through a series of process steps. The film carrier 33 preferably comprises a polyester casting film having a high gloss surface the film carrier 33 is important for high gloss applications because it imparts high gloss and DOI to the decorative paint film laminate 14. Advantageously, the film carrier 33 comprises polyethylene terephthalate (PET) in a grade without slip additives. The film carrier 33 is about 1 to about 3 mils in thickness, preferably about 2 mils in thickness.

The film carrier 33 passes through a first coating station 40. If a decorative paint film 18 having multiple coatings is desired, the first coating station 40 may deposit the clear coat layer 22. The clear coat layer 22 then passes through a dryer 41. Next, the gloss and DOI retaining layer is deposited and dried by dryer 43. Thereafter, a color coat layer 24 is deposited on the gloss and DOI retaining layer 23 using coating station 44. The color coat layer 24 is then dried using dryer 46. Optionally, the dried color coat layer 24 can be subjected to a corona treatment (not shown).

The coating stations 40, 42, and 44 may utilize any conventional coating or casting techniques, such as reverse roll coating or slot die coating techniques. Slot die coating methods are preferred. The dryers 41, 43, and 46 may utilize any conventional drying technique. Preferably, the dryers 41, 43, and 46 are ovens having multiple heating zones wherein each successive heating zone operates at a progressively higher temperature. For example, an oven having four to six heating zones ranging in temperature from about 200° F. to about 425° F. may be used. Alternatively, dryer 41 may be eliminated from the process such that the gloss and DOI retaining layer is applied to the clear coat 22 while the clear coat is still wet using a "wet on wet" coating technique.

After the decorative paint film 18 is applied to the film carrier 33, the film carrier advances to a primer coating station 48, where the primer layer 26 is deposited onto the exposed layer of the decorative paint film 18. The primer layer 26 is then dried using dryer 49. Thereafter, the film carrier advances to an adhesive coating station 50, where the adhesive layer 28 is deposited onto the primer layer 26. Thereafter, the adhesive layer 28 is dried using dryer 51. The primer coating station 48 and adhesive coating station 50 may utilize any conventional coating or casting technique, such as reverse roll coating or slot die coating techniques. The dryers 49 and 51 may utilize any conventional drying technique. Alternatively, dryer 49 may be eliminated from the process such that the adhesive layer 28 is applied to the primer layer 26 while the primer layer is still wet using a "wet on wet" coating technique known by one of ordinary skill in the art. Alternatively, the CPO/Primer can be coated directly on PET in a wet-on-wet process and then laminated using heat and pressure to the color layer of the paint film.

A backing sheet 30 is advanced from a supply roll 52 and laminated to the adhesive-coated surface of the film carrier 33. Optionally, the backing sheet 30 can be subjected to a corona treatment (not shown) prior to lamination. The resulting laminate is collected by product roll 54.

The decorative paint film laminate 14 of the present invention can be adhered to a supporting substrate 16 in accordance with known laminating or bonding techniques. Illustrative examples of supporting substrates 16 include, but are not limited to, metal, wood, and molded polymer substrates. As explained above, exterior automobile parts are particularly suitable as the substrate 16. Suitable polymers for use as the substrate 16 include, but are not limited to, thermoplastic olefin, acrylonitrile-butadiene-styrene terpolymer, polypropylene, thermoplastic polyimide, polyethylene oxide, polycarbonate, polyvinyl chloride, polystyrene, styrene/polyphenylene oxide (NORYEL), polybutylene terephthalate, nylon, PETG copolyester, Sheet Molding Compounds (SMC), RIM urethanes, mixtures, laminates, and copolymers thereof The decorative paint film laminate 14 may be applied to the substrate 16 by a variety of methods. These methods include, but are not limited to, compression molding, such as thermoplastic or thermoset compression molding, injection molding and the like. In an injection molding process, the decorative paint film laminate 14 may be preformed as described below or placed in the mold as a substantially flat sheet. If the paint film laminate 14 is placed in the mold without preforming, the heat and/or pressure of the molding process conforms the paint film laminate to the desired shape.

Figure 7A:
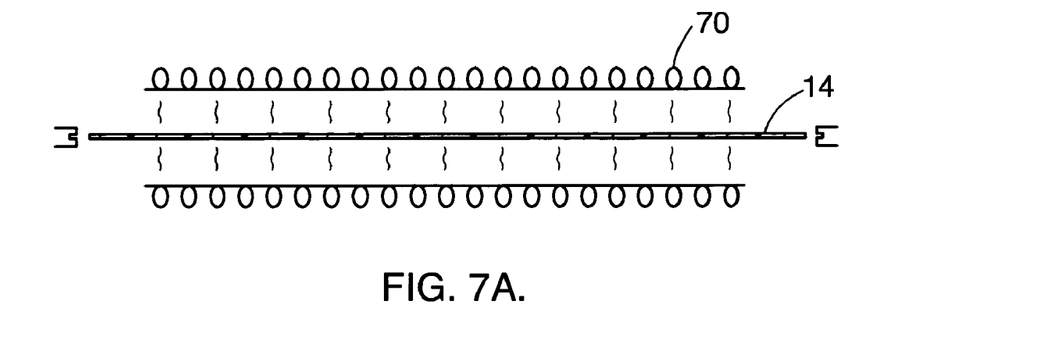
FIGS. 7A-7D are schematic illustrations of the steps in a thermoforming process used to construct a preform.
Figure 7B:
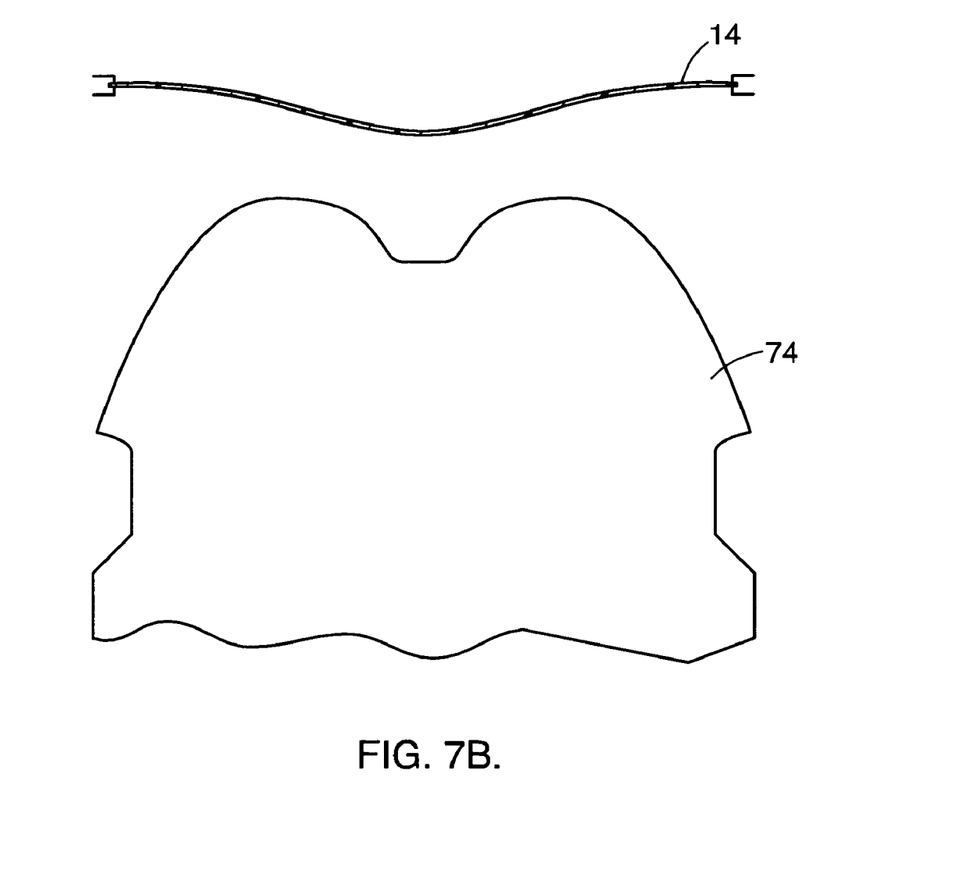
Figure 7C:
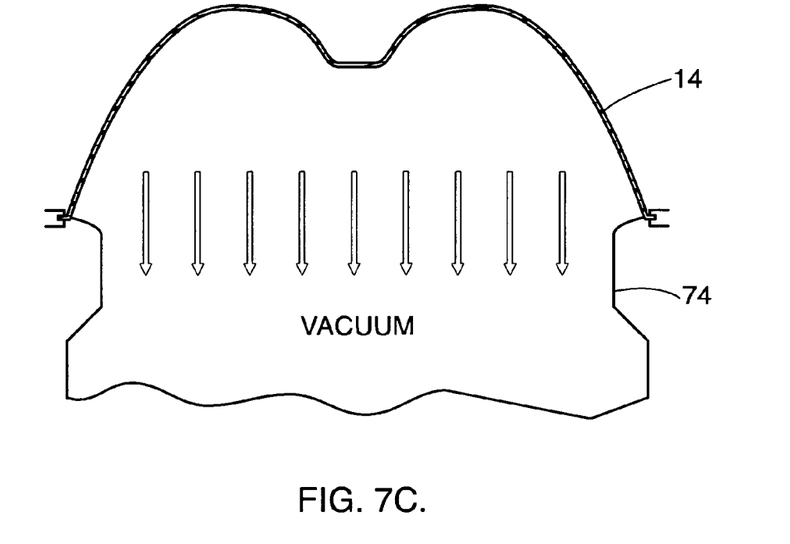
Figure 7D:
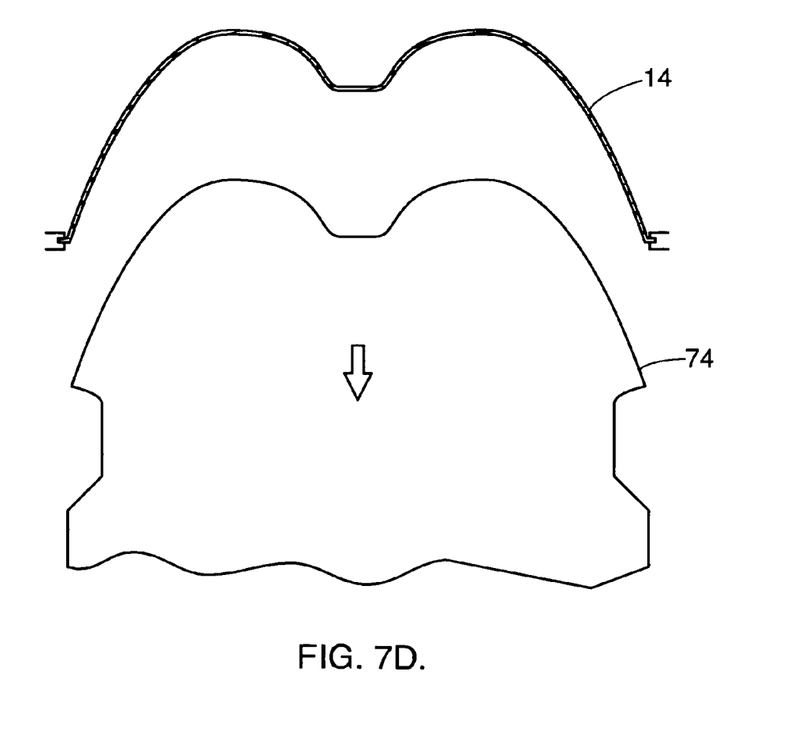

FIGS. 7A-7D illustrate the steps in a thermoforming process. Thermoforming is often used to create a preform in a three-dimensional configuration that roughly approximates the three-dimensional configuration of the final product. However, other forming processes known in the art may be used. The preform is then placed in a mold for in-mold surfacing of a desired substrate 16 to form the final product. FIG. 7A shows heating of the decorative paint film laminate 14 of the present invention by heating elements 70. The heating step softens and increases the extensibility of the decorative paint film laminate 14 so that the paint film laminate will readily conform to the contoured outer surface of the mold 74. As shown in FIG. 7C, the mold 74 is brought into contact with the heated decorative paint film laminate 14 and a vacuum is drawn to encourage conformity of the paint film laminate 14 to the contours of the mold 74. Thereafter, the mold 74 is removed from the decorative paint film laminate 14 and the paint film laminate is allowed to cool and harden into the three-dimensional configuration.

Figure 8A:
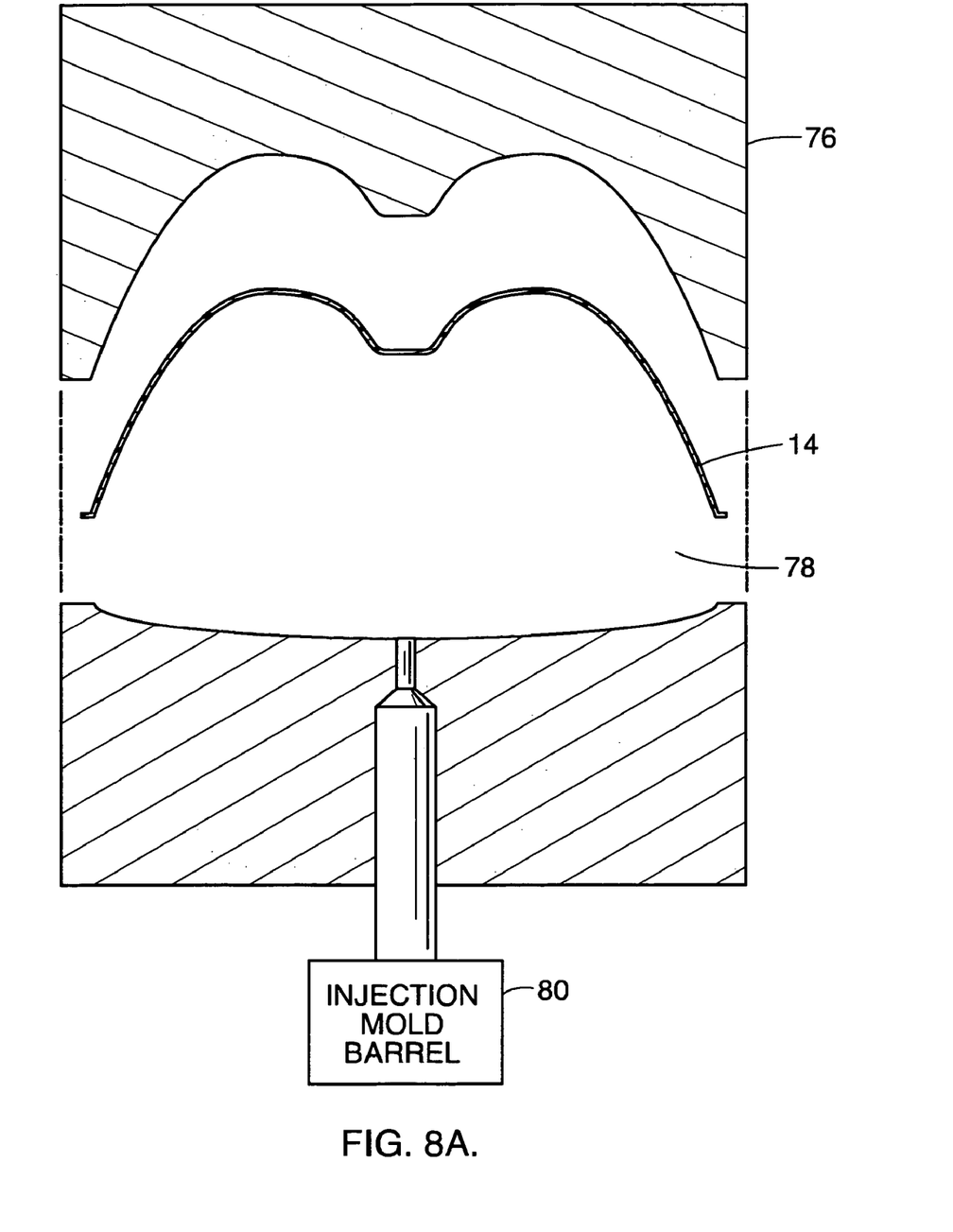
FIGS. 8A-8C are schematic illustrations of steps in an injection molding process for forming a composite shaped part.
Figure 8B:
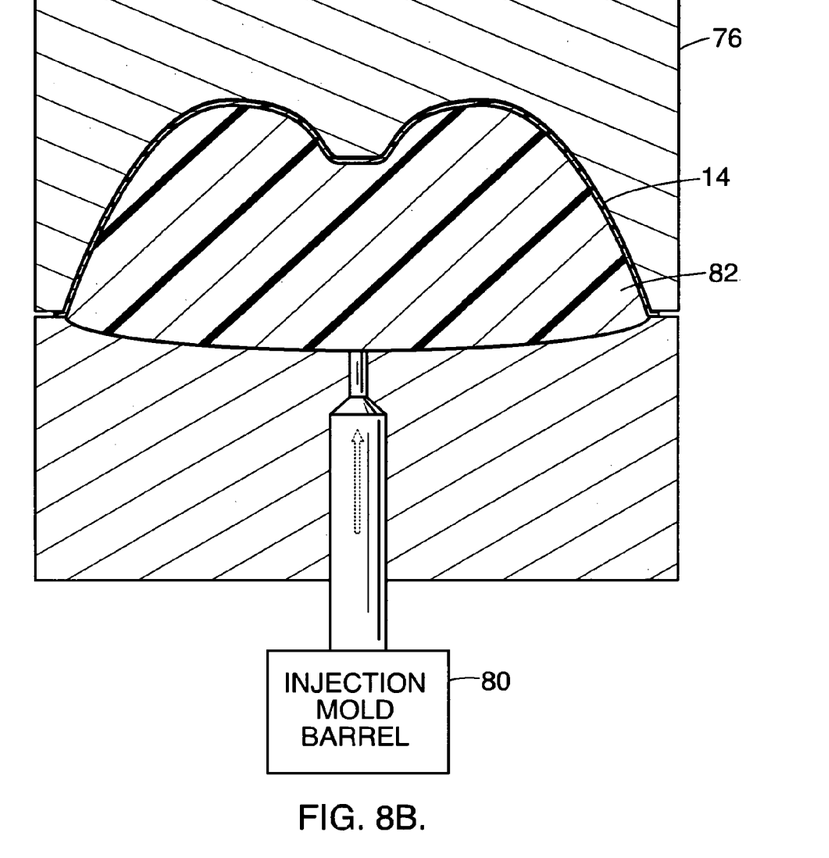
Figure 8C:
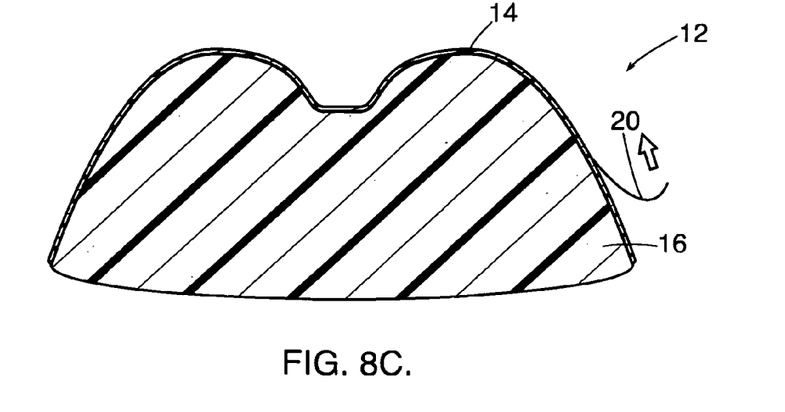

FIGS. 8A-8C illustrate steps in an in-mold surfacing process. As shown in FIG. 8A, the thermoformed decorative paint film laminate 14 is placed in the mold cavity 78 of an injection mold 76. The decorative paint film laminate is placed in the mold cavity 78 with the clear coat layer 22 facing the inner surface of the injection mold 76. Alternatively, the decorative paint film laminate 14 may be placed in the mold cavity 78 as a flat, two-dimensional insert rather than as a preform. The injection mold 76 is shut and a moldable polymer 82 is introduced into the mold 76 through the injection mold barrel 80. The polymer 82 bonds to the backing sheet 30 and conforms to the contoured shape of the mold cavity 78. Thereafter, the moldable polymer 82 is allowed to cool and harden into a composite shaped part 12 comprising a substrate 16 bonded to a decorative paint film laminate 14, as shown in FIG. 8C.

EXAMPLES

Example 1

Clear coat compositions were prepared in accordance with the present invention and are identified as Clear Coat Compositions A and B, respectively. The component amounts are based upon the total weight of the composition being on a 1 gram basis.

| Clear Coat Composition A | |
|---|---|
| TINUVIN 292 | 0.01184 g |
| TINUVIN 928 | 0.01184 g |
| ACRYLOID A11 | 0.15387 g |
| ELVACITE 2041 | 0.03957 g |
| KYNAR SL | 0.08288 g |
| MEK 99.4% | 0.59500 g |
| Cyclohexanone | 0.10500 g |

For the above formulation, TINUVIN 292 and TINUVIN 928 were added in the MEK/Cyclohexanone solvent blend first. The additives were stirred until dissolved. ACRYLOID A11, ELVACITE 2042 and KYNAR SL were added into the mix and stirred with high shear until the resins were dissolved.

| Clear Coat Composition B | |
|---|---|
| KYNAR SL | 0.09220 g |
| TINUVIN 928 | 0.00946 g |
| TINUVIN 292 | 0.00946 g |
| ACRY 68080 | 0.43480 g |
| Ethyl Acetate | 0.45404 g |

For the above formulation the TINUVIN 292 and TINUVIN 928 were added in Ethyl Acetate solvent first. The additives were stirred until dissolved. KYNAR SL was then added into the mix and stirred with high shear until the resins were dissolved. ACRY 68080 was then added into the mix slowly with high shear.

Example 2

Gloss and DOI Retaining Compositions were prepared in accordance with the present invention and are identified as Gloss and DOI Retaining Compositions A, B, C, and D, respectively. The component amounts are based upon the total weight of the composition being on a 1 gram basis.

| Gloss and DOI Retaining Composition A | |
|---|---|
| HD 4669 | 0.3902 g |
| HD 2113 | 0.5854 g |
| API-792 | 0.0244 g |

In Composition A, the HD4669 and HD2113 were mixed, and then the cross-linker API-792 was added and mixed for another 15 minutes.

| Gloss and DOI Retaining Composition B | |
|---|---|
| DPNB | 0.12675 g |
| HYBRIDUR 580 | 0.77773 g |
| Deionized Water | 0.08385 g |
| XAMA-7 | 0.01167 g |

| Gloss and DOI Retaining Composition C | |
|---|---|
| DPNB | 0.12675 g |
| HYBRIDUR 580 | 0.69996 g |
| AS 2505 | 0.07777 g |
| Deionized Water | 0.08385 g |
| XAMA-7 | 0.01167 g |

Compositions B and C were prepared as set forth below in Composition D by preparing a Pre-Mix with Diproplene Glycol Butyl Ether (DPNB).

| Gloss and DOI Retaining Composition D | |
|---|---|
| Glycol Ether DPNB | 0.11776 g |
| SURFYNOL DF-58 | 0.00140 g |
| BYK 346 | 0.00435 g |
| INHB TINUVIN | 0.00992 g |
| BYK 333 | 0.00062 g |
| HYBRIDUR 580 | 0.72329 g |
| Deionized Water | 0.13181 g |
| CYMEL 385 | 0.01085 g |

Gloss and DOI Retaining Composition D was prepared by first preparing a Pre-Mix as follows. DPNB solvent commercially available from Lyondell Chemical Company of Houston, Tex. was weighed into an appropriately-sized, grounded container. While stirring vigorously with high shear, TINUVIN 384 commercially available from Ciba Specilaty Chemicals of Tarrytown, N.Y. was added to the container and measured accurately. Stirring was continued and BYK 346 commercially available from BYK Chemie of Germany was added. The container was rinsed with mix, and the rinse was added. Stirring was continued, and BYK 333 commercially available from BYK Chemie of Germany was added. The container was rinsed with mix, and the rinse was added. Stirring was continued, and SURFYNOL DF-58 commercially available from Air Product and Chemicals of Allentown, Pa. was added. The container was rinsed with mix, and the rinse was added. The Pre-Mix was stirred for a minimum of 15 minutes or until all components were completely dissolved.

After preparation of the Pre-Mix, HYBRIDUR 580 commercially available from by Air Products of Allentown, Pa. was weighed out. Using a high shear mixer with an appropriately sized F-style Cowles blade (Vat-use 16" blade, Drum-use 8" blade), stirring was begun with a good vortex (~700 RPM). While stirring, the specified amount of the DPNB Pre-Mix was slowly poured. The DPNB caused the viscosity to rise, so the mixer speed was increased when adding the Pre-Mix, as necessary. One-third of the specified amount of deionized water was added. The vat was tightly covered with clear polyethylene film, and the mixture was stirred until the temperature reached 85° F. The time until temperature was reached was recorded. CYMEL 385 commercially available from Cytec Industries Inc. of West Paterson, N.J. was added and stirring was continued. The remaining two-thirds of the deionized water was added and stirred for thirty additional minutes. The vat was kept covered with polyethylene film. The mix temperature was monitored closely and was not allowed to exceed 85° F. The completed mix required a minimum sit time of 72 hours prior to coating.

Example 3

The following color coat compositions were prepared by starting with a clear base. An example of the clear base for the color coat is set forth below.

| Clear Base for the Base Coat | |
|---|---|
| ELVACITE 2042 | 0.24000 g |
| MEK 99.4% | 0.42000 g |
| XYLENE | 0.17165 g |
| TINUVIN 123 | 0.00278 g |
| TINUVIN 900 | 0.00557 g |
| ELVACITE R4402 | 0.16000 g |

| Black Color Formulation | |
|---|---|
| ACRY BLK B14276-M139 | 0.10666 g |
| ACRY WH W14276 M70 | 0.00444 g |
| ACRYLIC CLEAR BASE | 0.88890 g |

| White Color Formulation | |
|---|---|
| ACRY WH W14276 M70 | 0.19977 g |
| ACRY 29Y1038 TRANS YELL | 0.00111 g |
| ACRYLIC CLEAR BASE | 0.79912 g |

| D4D Acrylic Glossy Silver | |
|---|---|
| ACRYLIC CLEAR BASE | 0.90400 g |
| ALUM PASTE 3201 | 0.08000 g |
| DISP ACRY WH W14276 M70 | 0.01200 g |
| ACRY BLK B14276-M139 | 0.00400 g |

Example 4

Example 4 is illustrative of the preparation of a decorative paint film laminate and the thermoforming process.

The paint film samples (clear coat/color coat or clear coat/gloss retaining layer/color coat) were made from a production machine of Soliant, LLC of Lancaster, S.C. TPO adhesive was also coated onto the paint film on the production machine. The laminate samples were prepared by laminating the paint film with TPO adhesive to 30 mil TPO substrates using a lab laminator manufactured by Talboys Engineering Company of Emerson, N.J. with the hop nip temperature of 360° F. The lamination speed used was about 10 ft/min. The laminates were then thermoformed over a wood body side mold (Toyoto, 770 N body side mold) at 330° F. using a thermoformer manufactured by ZMD International, Inc, Model HD 333. Ninety percent (90%) of the maximum heat output was used for both top and bottom heat. The temperature was measured by an IR gun and from the substrate surface.

Gloss and DOI were recorded before and after thermoforming. The gloss was measured by the Micro-Tri-Gloss meter manufactured by BYK Gardner located in Columbia, Md. The DOI reading was obtained by using the I2R Glow Box, Model GB11-8 GM, manufactured by Instrument for Research and Industry, located at Cheltenham, Pa.

Table 1 sets forth the recorded gloss and DOI measurements and provides a comparison of standard paint films with and without a mask, relative to the paint films of the present invention with and without a gloss and DOI retaining layer. The mask used for the experiments was Soliant Premask commercially available from Soliant, LLC of Lancaster, S.C.

TABLE 1

| | Before thermoforming | | | After thermoforming | | |
|---|---|---|---|---|---|---|
| | 20° Gloss | 60° Gloss | DOI (%) | 20° Gloss | 60° Gloss | DOI (%) |
| Royal Ruby Red | | | | | | |
| Standard FLUOREX ® Paint Film w/o mask | 63 | 76 | 80 | 21 | 67 | 10 |
| Standard FLUOREX ® Paint Film with mask | 63 | 76 | 80 | 52 | 76 | 60 |
| Paint Film without Gloss and DOI Retaining Layer | 80 | 86 | 80 | 31 | 78 | 10 |
| Paint Film with Gloss and DOI Retaining Layer | 74 | 83 | 90 | 68 | 83 | 90 |
| Bright Silver | | | | | | |
| Standard FLUOREX ® Paint Film w/o mask | 68 | 90 | 60 | 30 | 79 | 0 |
| Standard FLUOREX ® Paint Film with mask | 68 | 90 | 60 | 50 | 87 | 20 |
| Paint Film without Gloss and DOI Retaining Layer | 84 | 100 | 70 | 34 | 94 | 0 |
| Paint Film with Gloss and DOI Retaining Layer | 81 | 100 | 80 | 79 | 100 | 50 |

TABLE 1-continued

|  | Before thermoforming | | | After thermoforming | | |
| --- | --- | --- | --- | --- | --- | --- |
|  | 20° Gloss | 60° Gloss | DOI (%) | 20° Gloss | 60° Gloss | DOI (%) |
| Tarnish Silver | | | | | | |
| Standard FLUOREX ® Paint Film w/out mask | 71 | 89 | 70 | 39 | 82 | 10 |
| Standard FLUOREX ® Paint Film with mask | 71 | 89 | 70 | 47 | 83 | 20 |
| Paint Film without Gloss and DOI Retaining Layer | 78 | 89 | 70 | 19 | 66 | 0 |
| Paint Film with Gloss and DOI Retaining Layer | 77 | 95 | 70 | 72 | 95 | 40 |

The clear coat for the standard FLUOREX® paint film of Table 1 was made with the following formulation:

| ELVACITE 2042 | 0.11920 g |
| KYNAR 500 | 0.30650 g |
| DB ACETATE | 0.18930 g |
| DMP DIMETHYL PHTHALATE | 0.18930 g |
| XYLENE | 0.18940 g |
| TINUVIN 900 | 0.00630 g |

The color coat for the standard paint film used the above formulation as a clear base. The clear coat for paint film with and without gloss retaining layer used the formulation shown in Clear Coat Composition B. The gloss retaining layer used the formulation shown in Gloss and DOI Retaining Composition D. The clear base used for the color coat for the paint film with and without gloss retaining layer was the same as the one shown. The color formulations for each of the colors (Ruby Red, Bright Silver and Tarnish Silver) are commercially available from Soliant, LLC of Lancaster, S.C.

Table 1 demonstrates that the Paint Film with Gloss and DOI Retaining layer offers an improvement over the paint film with a mask. It is significant that the paint films with the Gloss and DOI retaining layer are able to get in the lower end of the 20 degree gloss range for traditional paint, which even paint films with a mask have been unable to achieve. Traditional paints typically have a 70+ number for 20 degree gloss.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A decorative paint film laminate having enhanced gloss and distinctness of image after processing for providing a decorative finish for a part, the decorative paint film laminate comprising: a paint film having an inner surface and an outer surface with no mask adhered to the outer surface, and a backing sheet applied to the inner surface of the paint film, wherein the paint film comprises a clear coat layer, a gloss and distinctness of image retaining layer, and a color coat layer, and wherein the gloss and distinctness of image retaining layer has a tensile strength that is the same as or higher than the higher of the tensile strength of either the clear coat layer or the color coat layer at the thermoforming temperature.

2. The decorative paint film laminate according to claim 1, wherein processing is selected from the group consisting of forming or molding.

3. The decorative paint film laminate according to claim 2, wherein the forming is thermoforming at a thermoforming temperature.

4. The decorative paint film laminate according to claim 3, wherein the gloss and distinctness of image retaining layer has a tensile strength that is higher than the higher of the tensile strength of either the clear coat layer or the color coat layer at the thermoforming temperature.

5. The decorative paint film laminate according to claim 1, wherein the gloss and distinctness of image retaining layer is cast or coated.

6. The decorative paint film laminate according to claim 1, wherein the gloss and distinctness of image retaining layer comprises a polymer selected from the group consisting of urethane, acrylic, fluoropolymer, nylon, an alloy thereof, and a combination thereof.

7. The decorative paint film laminate according to claim 6, wherein the urethane is a polyurethane.

8. The decorative paint film laminate according to claim 6, wherein the fluoropolymer is polyvinylidene fluoride, polyvinyl fluoride, an alloy thereof, or a combination thereof.

9. The decorative paint film laminate according to claim 1, wherein the gloss and distinctness of image retaining layer is present between the clear coat layer and the color coat layer of the paint film.

10. The decorative paint film laminate according to claim 1, wherein the paint film further comprises a color adjustment layer.

11. The decorative paint film laminate according to claim 10, wherein the color adjustment layer is present between the gloss and distinctness of image retaining layer and the color coat layer.

12. The decorative paint film laminate according to claim 1, wherein the part is an automobile part.

13. The decorative paint film laminate according to claim 1, wherein the gloss and distinctness of image retaining layer is about 0.2 mils to about 2.0 mils in thickness.

14. The decorative paint film laminate according to claim 1, wherein the gloss and distinctness of image retaining layer further comprises a cross-linking agent.

15. The decorative paint film laminate according to claim 14, wherein the cross-linking agent is selected from the group consisting of poly-aziridine, poly-isocyanate, and blocked poly-isocyanate, and amino cross-linking agents.

16. The decorative paint film laminate according to claim 14, wherein the cross-linking agent is present in an amount from about 0.1 to about 4.0 weight percent.

17. The decorative paint film laminate according to claim 1, further comprising a primer layer.

18. The decorative paint film laminate according to claim 1, further comprising an adhesive layer.

19. The decorative paint film laminate according to claim 1, wherein the clear coat layer is about 0.3 mils to about 3 mils in thickness.

20. A paint film thermoformable at a thermoforming temperature, the paint film comprising: a clear coat layer, a gloss and distinctness of image retaining layer, and a color coat layer; wherein the gloss and distinctness of image retaining layer has a tensile strength the same as or higher than the higher of the tensile strength of either the clear coat layer or the color coat layer at the thermoforming temperature.

21. The paint film according to claim 20, wherein the tensile strength of the gloss and distinctness of image retaining layer is higher than the higher of the tensile strength of either the clear coat layer or the color coat layer at the thermoforming temperature.

22. A paint film comprising: a clear coat layer with no mask adhered to the clear coat layer; a gloss and distinctness of image retaining layer; and a color coat layer; wherein the gloss and distinctness of image retaining layer comprises a polymer selected from the group consisting of urethane, acrylic, fluoropolymer, nylon, an alloy thereof, and a combination thereof, and wherein the gloss and distinctness of image retaining layer has a tensile strength that is the same as or higher than the higher of the tensile strength of either the clear coat layer or the color coat layer at the thermoforming temperature.

23. A composite shaped part comprising: a substrate; and a decorative paint film laminate comprising a paint film comprised of a clear coat layer, a gloss and distinctness of image retaining layer, and a color coat layer, the paint film having an inner surface and an outer surface, a backing sheet applied to the inner surface of the paint film, and no mask on the outer surface of the paint film, and wherein the gloss and distinctness of image retaining layer has a tensile strength that is the same as or higher than the higher of the tensile strength of either the clear coat layer or the color coat layer at the thermoforming temperature.

24. The composite shaped part according to claim 23, wherein the paint film is thermoformable at a thermoforming temperature.

25. The composite shaped part according to claim 24, wherein the gloss and distinctness of image retaining layer has a tensile strength that is higher than the higher of the tensile strength of either the clear coat layer or the color coat layer at the thermoforming temperature.

26. The composite shaped part according to claim 23, wherein the gloss and distinctness of image retaining layer is cast or coated.

27. The composite shaped part according to claim 23, wherein the gloss and distinctness of image retaining layer comprises a polymer selected from the group consisting of urethane, acrylic, fluoropolymer, nylon, an alloy thereof, and a combination thereof.

28. The composite shaped part according to claim 27, wherein the urethane is a polyurethane.

29. The composite shaped part according to claim 27, wherein the fluoropolymer is polyvinylidene fluoride, polyvinyl fluoride, an alloy thereof, or a combination thereof.

30. The composite shaped part according to claim 23, wherein the gloss and distinctness of image retaining layer is present between the clear coat layer and the color coat layer of the paint film.

31. The composite shaped part according to claim 23, wherein the paint film further comprises a color adjustment layer.

32. The composite shaped part according to claim 31, wherein the color adjustment layer is present between the gloss and distinctness of image retaining layer and the color coat layer.

33. The composite shaped part according to claim 23, wherein the composite shaped part is an automobile part.

34. The composite shaped part according to claim 23, wherein the gloss and distinctness of image retaining layer is about 0.2 mils to about 2.0 mils in thickness.

35. The composite shaped part according to claim 23, wherein the gloss and distinctness of image retaining layer further comprises a cross-linking agent.

36. The composite shaped part according to claim 35, wherein the cross-linking agent is selected from the group consisting of poly-aziridine, poly-isocyanate, blocked isocyanate, and amino cross-linking agents.

37. The composite shaped part according to claim 35, wherein the cross-linking agent is present in an amount from about 0.1 to about 4.0 weight percent.

38. The composite shaped part according to claim 23, further comprising a primer layer.

39. The composite shaped part according to claim 23, further comprising an adhesive layer.

* * * * *